United States Patent

[11] 3,579,276

[72] Inventor Harold R. Newell
South Newbury, N.H.
[21] Appl. No. 627,410
[22] Filed Mar. 31, 1967
[45] Patented May 18, 1971
[73] Assignee Mesur-Matic Electronics Corporation
Warner, N.H.

[54] HARMONIC DRIVE FOR DIGITAL STEP MOTOR
7 Claims, 3 Drawing Figs.

[52] U.S. Cl. ............................................. 310/82,
310/83
[51] Int. Cl. ............................................... H02k 7/06
[50] Field of Search ................................... 310/80, 82,
83, 84

[56] References Cited
UNITED STATES PATENTS

| | | | |
|---|---|---|---|
| 3,428,839 | 2/1969 | Singleton | 310/80 |
| RE22,549 | 9/1944 | Plensler | 310/82 |
| 3,117,244 | 1/1964 | Rosain | 310/82 |
| 3,200,668 | 8/1965 | Janes | 310/83 |
| 3,262,081 | 7/1966 | Fairbanks | 310/82 |
| 3,341,725 | 9/1967 | Gifford | 310/82 |

*Primary Examiner*—Milton O. Hirshfield
*Assistant Examiner*—Mark O. Budd
*Attorney*—Hurvitz, Rose and Greene ABSTRACT: A step motor has first and second circular coaxial gears mounted on a rotor disc for pivoting and rotation relative to a shaft extending through the disc. Third and fourth circular coaxial gears are arranged to mesh with respective ones of the first and second gears but are normally separated along the shaft from the first and second gears so that meshing can occur only in a limited common sector of the gears upon tilting of the disc on the shaft. The third gear is fastened irrotationally relative to the axis and the fourth gear is fastened to the shaft. The disc comprises electromagnetic material and is subjected to an electromagnetic field that rotates about the shaft, in response to sequential energization of electromagnetic actuators disposed in a circular array about the shaft, to produce wobble motion of the disc about the shaft. At least one pair of meshing gears have different numbers of teeth so that wobble of the disc is accompanied by rotation of the fourth gear, and hence, of the shaft, about the axis.

Patented May 18, 1971

3,579,276

INVENTOR
HAROLD R. NEWELL

BY Hurvitz, Rose & Greene

ATTORNEYS

HARMONIC DRIVE FOR DIGITAL STEP MOTOR

BACKGROUND OF THE INVENTION

The present invention relates generally to motors and to drive systems therefor, and more particularly to digital step motors employing electromagnetic harmonic drive.

A more complete understanding of the concepts, features and advantages of the present invention will be gained by initially examining some of the pertinent prior art. The concept of harmonic drive is presented in detail in U.S. Letters Pat. No. 2,906,143, entitled "Strain Wave Gearing," issued Sept. 29, 1959 in the name of C. W. Musser. In essence, the invention therein disclosed encompasses a motion transmitting device having a rigid circular ring gear, a flexible ring gear of different diameter from the rigid ring gear and coaxial therewith, and a strain inducing device for driving the flexible ring gear while deflecting it such that the teeth thereof are in mating relation with the teeth of the rigid ring gear at a plurality of circumferentially spaced positions interposed by areas in which two gears are separated (or the teeth thereof nonmating), whereby rotational driving of the flexible ring gear by the strain inducer is accompanied by propagation of a strain wave about the periphery of the flexible ring gear, with relative rotation between the two ring gears. That is, the areas of mating relationship or engagement between the teeth of the two gears are peripherally propagated in the form of a sinusoidal or substantially sinusoidal wave, representative of a wave deflection in one of the gears and hence referred to as a strain wave. Accordingly, the basic system of motion and power transmission is called strain wave gearing or harmonic drive.

According to the Musser patent referred to above, the circular gear or ring gear is an annular ring provided with internal teeth, i.e., teeth projecting radially along the inner periphery. The flexible gear or strain gear is also annular, being disposed within the rigid ring gear, fabricated of a thin resilient material capable of elastic deflection, and provided with external teeth projecting radially about and from the outer periphery thereof. The pitch diameters of the two gears differ as a consequence of the difference in number of teeth between the gears, the strain gear having fewer teeth than the ring gear by a number equal to or a multiple of the number of positions of mating engagement between the gears, in accordance with the predetermined distortion of the strain gear by the strain inducer when the gears are disposed one within the other. By virtue of this arrangement, at any given instant of time a large percentage of the teeth of the two cooperating gears are in contact, more than 50 percent of each.

As generally disclosed by Musser, the strain inducer is mounted on a shaft with which the strain gear and ring gear are coaxial, and has a configuration adapted to exert forces on the inner periphery of the strain gear, when inserted into a position inside the latter, so as to deflect or distort the wall of the strain gear to produce the desired configuration of mating relationship between the two gears at a plurality of circumferentially spaced positions. Thus, as the strain inducer undergoes rotation the strain gear is driven such that the teeth of the two gears enjoy complete engagement at only a limited portion of each position of mating relation and have varying degrees of engagement at either side of each limited portion, being completely separated from one another in area approximately midway between positions of mating relation in those cases where sufficient disparity exists between pitch diameters (and tooth differential) of the gears. Accordingly, a strain wave is propagated about the periphery of the strain gear, one complete revolution of which is characterized by a tooth movement equal to the tooth differential between the gears, the gears undergoing relative rotation. Musser emphasizes that the strain inducer need not be the driving element; rather that any of the three elements (i.e., ring gear, strain gear or strain inducer) may be the driving element and either of the remaining two the driven element. The gear having the largest number of teeth per radian moves in the same direction as the strain inducer when the latter is the driving element.

Among the variations of strain inducer or wave generator mentioned by Musser in his aforementioned patent are a pair of electromagnetic embodiments, one involving polyphase energization and the other single-phase energization. More recent patents of related disclosure indicate a recognition that electromagnetically energized strain wave gearing or harmonic drives were not actually previously constructed, and proceed to disclose suitable forms thereof. One of these patents, U.S. Pat. No. 3,169,201, entitled "Electromagnetic Harmonic Device" issued 9 Feb. 1965, in the names of Spring et al., contemplates elimination of the mechanical strain inducer or wave generator cam and its bearing, and of the shaft coupled thereto, as provided in the invention disclosed in the aforementioned Musser patent, and utilization in its stead of an electromagnetic drive system including a stator and a rotor. The rotor of the Spring et al. invention comprises a plurality of thin flat magnetically permeable plates of substantial nonretentivity projecting radially from and lying in planes intersecting the common axis of the output shaft and the gears, toward respective lineal positions adjacent the surface of the strain gear (also termed "flexspline") remote from the ring gear (also termed "circular spline"), and arranged to pivot against that surface when subjected to magnetizing force. The stator comprises an even number of evenly spaced pairs of solenoid coils (with magnetic cores) disposed in a circular array coaxial with the array of rotor plates and spaced from portions of the plates protruding from the flexspline. Progressive radial distortion of deflection of the flexspline to produce a mating relation between the two splines (gears) at a plurality of points is effected by energization of an appropriate plurality of the coils in a desired sequence, thereby sequentially forcing the magnetic plates (i.e., deforming the armature) against the internal surface of the flexspline, resulting in strain wave meshing of the splines as in the aforementioned Musser patent. The Spring et al. patent discloses this electromagnetic wave generator as an actuator for a digital stepping motor, wherein diametrically opposed pairs of solenoid coils are energized in sequence by a control circuit, also disclosed, to produce radial deflection of the flexspline into an elliptoidal shape, with progressive circumferential strain wave deflection in discrete steps.

In U.S. Pat. No. 3,169,202, issued 9 Feb. 1965 in the names of Proctor et al. still other types of electromagnetic actuators for strain wave gearing or harmonic drives are disclosed, these actuators having a continuously rotating field and differing one from another primarily in respect to type of armature. The basic configuration by which the strain wave deflection is propagated is, however, entirely similar to that disclosed in the aforementioned Musser and Spring et al. patents. The armatures described in the Proctor et al. patent include an endless chain of magnetically permeable rigid links, adjacent links pivotal relative to one another, the chain disposed adjacent the surface of the flexspline remote from the ring gear; a laminated core, the laminations being in successive plates along the axis of the actuator and coaxial therewith, the periphery of the successive laminations being interrupted by equiangularly spaced slots in which magnetic powder is disposed, adjacent the internal surface of the flexspline; and a coiled magnetically permeable flat strip positioned adjacent the internal surface of the flexspline. In the case of each of these types or armature the continuously rotating field produced by appropriate energization of an associated stator is effective to distort the respective armature, thereupon subjecting the flexspline to deflecting forces.

SUMMARY OF THE INVENTION

The present invention is also directed toward electromagnetic harmonic drives but encompasses a basic form thereof differing substantially from the prior art basic forms as enumerated above, and provides several advantages thereover.

It is accordingly a broad object of the present invention to provide novel electromagnetic harmonic drive systems.

Another broad object of the invention is to provide digital stepping motors having electromagnetic harmonic drive.

Briefly, in accordance with an embodiment of the present invention, a pair of cooperating circular ring gears of the same diameter are provided with teeth projecting from confronting planes. At least one of the ring gears is rigid, fastened to the internal surface of the larger diameter wall of a concentric double cylindrical walled housing having a bridge joining the walls at a common end thereof to form a "doughnut cup" shaped enclosure. This enclosure or housing contains a laminated annular magnetic core having a plurality of equiangularly spaced coils, corresponding to the desired number of motor phases, wound thereon. A shaft extends within the inner wall of the housing along the axis thereof and is mounted for rotation in bearings retained at either end of the space encompassed by the inner wall. An armature in the form of a magnetically permeable circular plate is retained on the shaft for relative rotation therewith and has adjacent its periphery along a planar surface of the plate the second of the aforementioned ring gears, one ring gear (preferably that on the armature) having at least one less tooth than the other ring gear, the teeth of the two gears normally spaced from one another. In the preferred embodiment the armature is rigid, as is its ring gear. One end of the magnetic core in the housing confronts the armature and as the phases (field windings) of the motor are energized in the desired switching format, the armature is successively pulled toward each energized coil. Accordingly, the teeth of the two ring gears are forced into mating engagement, i.e., intermesh, at only one limited region of each gear at any given instant of time. As the coil switching progresses the armature wobbles about the shaft, the position at which its ring gear meshes with the stationary ring gear fastened to the housing propagating sinusoidally along that gear in accordance with the wobble motion. This constitutes a substantially sinusoidal wave motion, the armature constituting a mass rotating at an extremely low rotatory rate which depends upon tooth differential, number of motor phases, and switching format for the phases. A relative rotation occurs between the two ring gears, and if the armature has the fewer teeth it rotates that number of fewer teeth for each revolution of the wobble (i.e., each revolution of the intermeshed position of the gears), and in a reverse direction to the direction of rotation of the wobble. Means are provided by which the armature is coupled to the shaft to drive the latter in accordance with armature rotation so that the shaft undergoes discrete (stepped) rotational motion in accordance with the switching format phase energization of the motor.

The following factors will be noted from the brief treatment of the preferred embodiment of the invention and will become more apparent from the subsequent detailed description. First, in the harmonic drive system of the present invention the teeth of the cooperating ring gears are engaged at only one portion of the overall ring, so that complete or partial meshing occurs between only a small number of teeth at any given instant of time. Consequently, the load or force on the shaft is not truly balanced, a condition which is somewhat disadvantageous when compared with harmonic drive systems of the prior art.

However, the present invention enjoys several advantages over prior art harmonic drives, resulting in a decided overall improvement. For example, no power need by applied to the "strain inducer" of the present invention unless actual stepped rotation is desired. In contrast, the prior art systems require application of power to the strain inducer in order to deform the flexspline even when the system is in a hold condition, i.e., undergoing no rotational movement but in a state of preparedness to do so. Over a lengthy period of continuous use this can result in a substantial power saving in favor of the apparatus of the present invention.

Moreover, the prior art flexsplines have been found to be resonant at a number of different frequencies, a condition which results in loss of smooth and efficient performance. This cannot readily occur in the drive system of the present invention, because unlike the prior art strain gears, there is no thin elastic tubular flexspline structure.

Still another factor in favor of the present invention is that the large mass rotates at a very low rate, relatively, as compared with rotating members in the prior art drive systems.

In terms of production, the elements or components of the harmonic drive of the present invention are less costly and involve far fewer technical problems than are found in the manufacture of components for prior art electromechanical or electromagnetic harmonic drive. For example, the cutting of teeth along the internal periphery of a flexible circular spline or ring gear requires unorthodox and expensive procedures, unnecessary for the "strain" gear of the present invention. In addition, the prior art rotor, stator, and armature components are relatively complex and require substantial hand assembly, unlike corresponding components of the present invention.

It is therefore another object of the present invention to provide a motion transmitting system comprising a pair of cooperating gears having confronting teeth lying in normally spaced generally parallel planes, electromagnetic means for selectively deflecting one of said gears relative to the other so that teeth thereof are engaged at only one limited region of both gears at any given instant, said gears having different numbers of teeth so that continued deflection of said one gear at successive tooth positions therealong is accompanied by relative translation of said pair of gears.

BRIEF DESCRIPTION OF THE DRAWINGS

The above and still further objects, features and attendant advantages of the present invention will become apparent from a consideration of the following detailed description of a preferred embodiment thereof, especially when taken in conjunction with the accompanying drawings, in which.

DESCRIPTION OF THE PREFERRED EMBODIMENT

Figure 1:
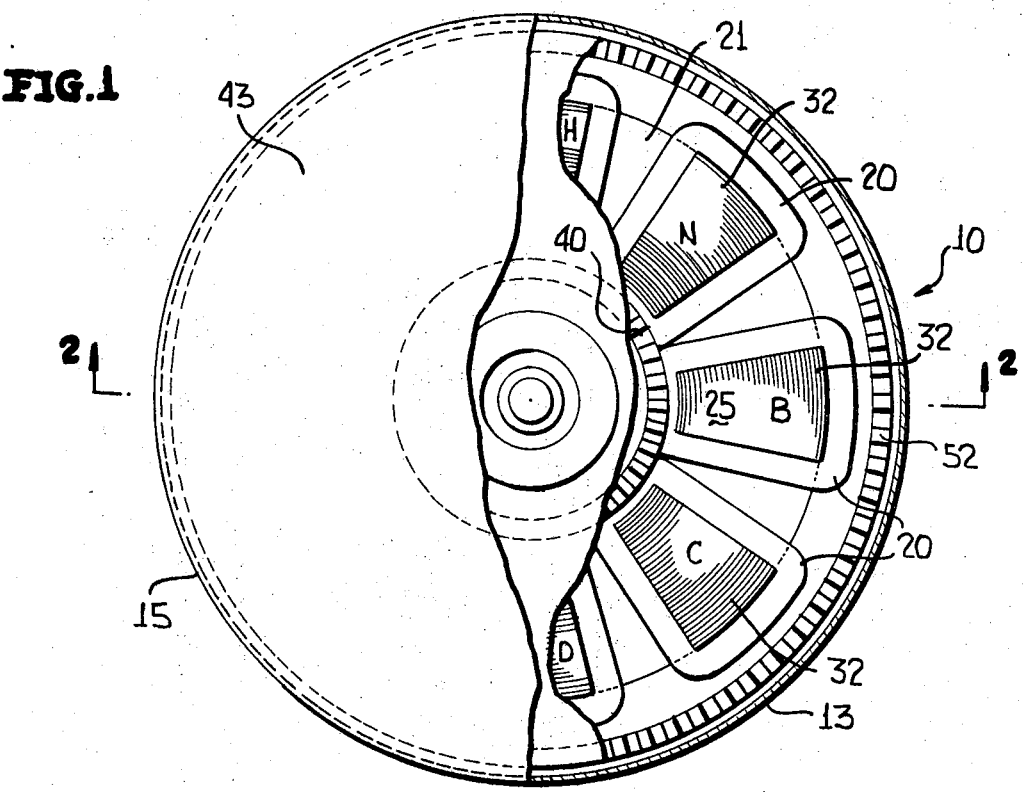
FIG. 1 is an armature end view of a digital step motor having harmonic drive, in accordance with an embodiment of the invention.

Referring now to the drawings, the step motor includes a doughnut-shaped housing 10 comprising a pair of coaxial cylindrical walls 12, 13 bridged at a common end 15 by a wall 17. Housing 10 is composed of any suitable nonmagnetic material and is adapted to partially enclose and retain the field windings 20 and magnetic core 21 of the stator portion 25 of the digital step motor.

Core 21 preferably comprises a strip of magnetically permeable sheet material wound in successive layers in an annular or toroidal configuration. The core is preferably provided with angularly spaced slots 30 to accommodate field windings 20 wound on the successive laminations of magnetic sheet material of which the core is comprised. The field winding end terminations or leads are brought out through the housing at any convenient point or points (not shown) to permit connection to an energizing circuit (not shown). The winding or phase energizing circuit may be completely conventional and, since it does not come within the essence of the invention, need not be described or further discussed.

Pole faces 32 of magnetic core 21 are milled off at a slight angle, 1° for example, (as shown at 33) to the plane perpendicular to the axis of the core, for reasons which will be discussed presently.

A shaft 35 is disposed along the axis of the symmetrical motor structure thus far described, mounted for rotation in bearings 37 and 38 at the bridged and free ends, respectively, of cylindrical wall 12 of housing 10. The shaft is provided with a larger diameter section 39, or with suitable collars, to insure its longitudinal retention within the bearings, the latter being preferably designed to accept axial as well as radial loads. Pinned or otherwise suitably fastened to shaft 35 at a point adjacent bearing 38 is a circular ring gear 40, hereinafter referred to also as "inner" or "internal" ring gear 40 to prevent confusion with other ring gears of greater diameter. It will be apparent then that ring gear 40 follows the rotation of the shaft, or vice versa.

Further along the shaft there is disposed a rotor or armature 43 which in the preferred embodiment is a magnetically permeable rigid circular plate. A bearing cup 45 is fastened within a centrally located hole in rotor 43 to hold the rotor to a bearing 46 (manufactured by Heim, No. LS–5). The bearing 46 includes a ball member 47 retained on the shaft and on which the rotor is permitted to pivot. Hence, rotor or armature 43 can undergo rotation relative to the shaft and is capable of assuming a position at a slight angle to the shaft. A retaining ring 48 is press-fitted on shaft 35 to prevent the rotor from lifting.

Armature 43 is provided with a pair of ring gears 49, 50 fastened to or cut on that one of its surfaces confronting the pole faces 32 of magnetic core 21, ring gear 49 being indentical or substantially identical to ring gear 40 in respect to diameter and number or character of teeth, and adapted to mate therewith. The outer or external ring gear 50 is disposed at the underside of armature 43 adjacent its outer periphery, and opposite a stationary ring gear 52 of substantially equal diameter fastened to the inner surface of the free end of cylindrical wall 13 of housing 10.

The relative positions of the several ring gears of the motor configuration are such that confronting teeth on cooperating outer gears 50 and 52 and cooperating inner gears 49 and 40 can mesh only in a limited area of each respective pair of gears along a common sector from the axis of the overall structure at any given instant. The diameters of the outer cooperating gears 50 and 52 are substantially equal, but the number of teeth, and hence tooth size, differ. In the exemplary embodiment shown, armature ring gear 50 has 359 teeth and stationary ring gear 52 has 360 teeth. Each of the inner gears 40 and 49 is provided with 60 teeth, all teeth cut on a 45° angle.

Figure 2:
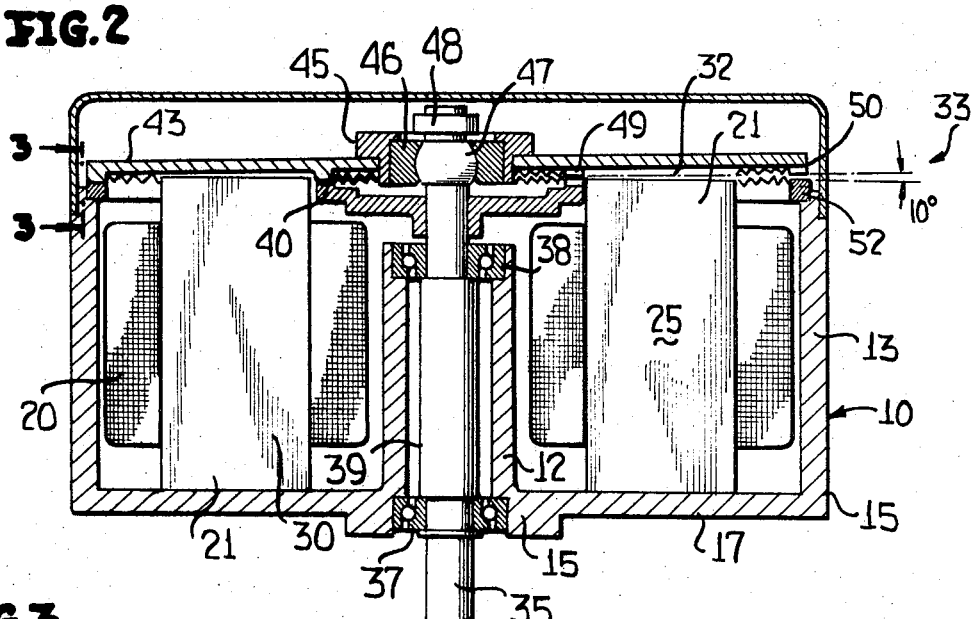
FIG. 2 is a sectional view taken along the lines 2—2 of FIG. 1.

Housing 10 is closed by a cuplike cover 60 (FIG. 2) which, like the housing, is composed of nonmagnetic material. Preferably, the stator, including winding 20 and core 21, is potted within housing 10 up to or slightly beyond the level of the field windings, using an epoxy resin for example. While eight field windings (phase) are shown, a smaller or greater number phases may be utilized, as desired.

In operation, the field windings are selectively energized by the switching or energizing circuit (not shown) in accordance with the preselected switching format, for example A+B, B+C, C+D, D+E, E+F, F+G, G+H, H+A, et cetera, the armature being pulled toward the energized windings in the recited sequence. Thus, the two outer gears 50 and 52 mesh along a limited portion, and this meshed region propagates with the "phase switchings" and consequent wobble of armature 43 about shaft 35. The slight angle of the pole faces with respect to a plane perpendicular to the shaft permits this rotor wobble to occur without interference between members. Because of the differing number of teeth on the rotor and stator outer gears 50 and 52, respectively, a relative rotation between these elements takes place as the point of meshing rotates one full revolution, i.e., for each 360° of "wobble-around" of the rotor. In particular, for the above-stated number of teeth, the armature (rotor) rotates 1°, which coincides with one tooth, for each 360° of wobble, and in a reverse direction to the direction of wobble. If the number of teeth on the rotor ring gear 50 were greater than that on the stator ring gear 52, the relative rotation would be in the same direction as the wobble.

As the armature rotates, the teeth of the inner gears 40 and 49 also mesh, so that shaft 35 undergoes 1° of rotation (for the stated number of teeth) per full revolution of wobble. With eight field windings (phases), each revolution of wobble requires eight phase switchings. Accordingly, each 360° rotation of the shaft requires 8×360=2880 steps or phase switchings.

A wide number of variations of construction may be effected within the contemplation of the present invention. For example, the rotor 43 may be composed of flexible material incorporating rigid or powdered magnetic material to permit flexing into contact with the stator outer gear as the field windings are switched.

Moreover, the cooperating surfaces of the gears need not be provided with teeth, but may be splined, ridged, knurled or otherwise supplied with surfaces capable of frictional engagement or contact. In fact, such frictional resilient material as natural or synthetic rubber may be utilized for the cooperating surfaces of the gears, or one surface may be rubber and the other rigid with frictional contact portions such as ridges for enhancement of mating. In such cases, the angle of the rotor requires that the circumference of the contacting surface of the rotor be somewhat greater than the circumference of the contacted surface of the stator "gear." The smaller the angle of rotor tilt, the greater the ratio of "wobble-arounds" versus shaft rotation, as may readily be determined from trigonometry.

The magnetic field effecting the rotor wobble may be produced by energizing separate phases in a DC switching format, or by two- or three-phase AC energization.

Any of these modifications produces, as in the preferred embodiment, extremely low rotational speeds with high positioning accuracy and with simple construction and inexpensive components.

Figure 3:
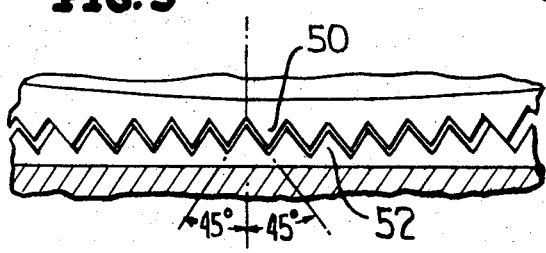
FIG. 3 is a fragmentary perspective view of the single area of engagement of the teeth of the external cooperating ring gears of FIGS. 1 and 2.

In the preferred embodiment which has been described, references to the single limited region or area of contact or engagement should not be taken as necessarily implying a single point or position of contact. In many instances, the single region of contact may, in fact, extend over a substantial length, but unlike the prior art there are no multiple areas of engagement separated by areas in which the two gears are displaced substantially from one another. In the case where the cooperating surfaces of the gears are rigid triangular teeth, for example, it happens that actual contact between the two toothed surfaces occurs at two spaced points at which the sides of the mating teeth rest against one another and between which the teeth are lifted slightly from each other (see FIG. 3). For practical purposes, however, the entire area or region between these contact points constitutes the area of frictional contact or mating engagement, since true meshing, cooperation, or engagement exists throughout such area.

The advantages of this cooperating frictional surface approach as contrasted with prior art flexible spline arrangements include, for example, a very low holding power requirement, since there is no inertial "springiness" to overcome; improved transient (start-stop) response because of the lack of such "springiness" in the drive; greater efficiency; economy in fabrication and production; and nonslip operation.

I claim:

1. A step motor, comprising first and second circular coaxial gears mounted for common rotation about their axis, third and fourth circular coaxial gears sharing said axis and cooperating with said first and second gears to undergo respective meshing therewith, coupling means normally separating said first and second gears axially from said third and fourth gears and providing a pivot for tilting of said first and second gears relative to said axis into meshing engagement with a common sector of said third and fourth gears, means securing said third gear in irrotational relation to said axis, a shaft extending only along said axis, and projecting through said coupling means to permit rotation of said first and second gears relative to said shaft while undergoing tilting relative to said axis, means fastening said fourth gear to said shaft for rotation therewith, and means effective, when actuated, to exert a circularly moving deflecting force on said first and second gears to produce circularly moving tilting thereof in a wobble motion about said shaft to enable said meshing engagement, said first and third meshing gears having different numbers of teeth thereon so that wobbling of said first and second gears about said shaft is accompanied by rotation of said fourth gear, and with it, rotation of said shaft about said axis.

2. The step motor according to claim 1 further including a magnetically permeable disc on which said first and second gears are mounted for said common rotation, and wherein said actuating means includes a plurality of electromagnetic actuators disposed in a circular array about said axis and responsive to sequential energization in a predetermined switching format to produce an electromagnetic field in the vicinity of said disc for exerting said circularly moving deflecting force on said disc.

3. The step motor according to claim 2 wherein said disc is at least partly composed of flexible material.

4. the motor of claim 1 wherein said coupling means includes a disc on which said first and second gears are mounted for said common rotation, said disc having an axial opening, and a universal bearing retained on said shaft and received within said disc opening for pivotally and rotationally coupling said disc to said shaft.

5. The step motor according to claim 4 wherein said disc is substantially limited to a tilt angle on the order of one degree relative to a plane perpendicular to said shaft.

6. A step motor, including
a rigid nutatable circular disc,
first and second circular gears secured rigidly and removably to said rigid nutating disc and nutatable therewith, said circular gears both concentric with the axis of said disc,
third and fourth nonrotating gears located concentrically of said axis,
said fourth of said nonrotating gears being stationary,
said nonrotating gears being so located with respect to said circular gears that on nutation of said rigid nutating disc said first gear fully engages said third gear and simultaneously said second gear fully engages said fourth gear at progressively moving points about the circumferences of said disc, said second and fourth gears having different numbers of gear teeth,
a rotatable output shaft for said step motor, said output shaft having a longitudinal axis coincident with said axis of said disc,
means including a ball and socket joint for mounting said disc on said shaft for nutation about said shaft, the socket of said ball and socket joint being rigidly secured to said disc and said ball of said ball and socket joint being mounted on said shaft,
means securing said third gear rigidly and nonrotatably to said shaft, and
electromagnetic means for enforcing nutation of said disc.

7. A step motor, comprising
first and second rotatable gears,
means for identically nutating said gears,
a stationary gear meshing at first points sequentially taken around its circumference with said first nutatable gear,
said first nutatable gear and said stationary gear having different numbers of teeth,
an output shaft,
a rotatable output gear rigidly coupled to said output shaft to effect rotation of said output shaft,
said rotatable output gear meshing at second sequentially taken points around its circumference with said second nutatable gear,
said sequential points being always in a common radial plane with respect to the axis of said output shaft, and means securing said nutating gears rotatably on and with respect to said shaft,
said last means being a ball and socket joint, of which the socket is rigidly secured to said nutatable gears and said ball is mounted on said shaft.